(12) United States Patent
Patel et al.

(10) Patent No.: US 11,604,743 B2
(45) Date of Patent: Mar. 14, 2023

(54) INPUT/OUTPUT QUEUE HINTING FOR RESOURCE UTILIZATION

(71) Applicant: International Business Machines Corporation, Armonk, NY (US)

(72) Inventors: Kushal S. Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/006,969

(22) Filed: Aug. 31, 2020

(65) Prior Publication Data

US 2022/0066957 A1    Mar. 3, 2022

(51) Int. Cl.
| | | |
|---|---|---|
| G06F 13/38 | (2006.01) | |
| G06F 13/16 | (2006.01) | |
| G06Q 20/14 | (2012.01) | |
| G06Q 10/0631 | (2023.01) | |
| G06Q 30/04 | (2012.01) | |
| G06F 12/123 | (2016.01) | |
| G06F 8/61 | (2018.01) | |

(52) U.S. Cl.
CPC ........ *G06F 13/1668* (2013.01); *G06F 12/123* (2013.01); *G06Q 10/06312* (2013.01); *G06Q 20/145* (2013.01); *G06Q 30/04* (2013.01); *G06F 8/61* (2013.01)

(58) Field of Classification Search
CPC ...... G06F 13/1668; G06F 12/123; G06F 8/61; G06Q 10/06312; G06Q 20/145; G06Q 30/04
See application file for complete search history.

(56) References Cited

U.S. PATENT DOCUMENTS

| | | | | |
|---|---|---|---|---|
| 9,798,682 B2* | 10/2017 | Walker | ................ | G06F 9/45533 |
| 10,089,134 B2* | 10/2018 | Geml | ................ | G06F 9/45558 |
| 10,331,600 B1* | 6/2019 | Rajadnya | ............ | G06F 12/0246 |
| 10,613,778 B2* | 4/2020 | Hahn | ................ | G06F 12/0246 |
| 10,852,990 B2* | 12/2020 | Yang | ................ | G06F 9/45558 |
| 10,866,910 B2* | 12/2020 | Benisty | .............. | G06F 13/1642 |
| 11,036,533 B2* | 6/2021 | Pinto | ...................... | G06F 9/546 |

(Continued)

FOREIGN PATENT DOCUMENTS

| | | | | |
|---|---|---|---|---|
| CN | 111722786 A | * | 9/2020 | |
| CN | 114090274 A | * | 2/2022 | |

(Continued)

OTHER PUBLICATIONS

Unknown, "NVM Express", Revision 1.3, May 1, 2017, 282 pages.

(Continued)

*Primary Examiner* — Cheng Yuan Tseng
(74) *Attorney, Agent, or Firm* — Stosch Sabo

(57) ABSTRACT

Described are techniques including a method comprising detecting a deallocated Input/Output (I/O) queue associated with a first entity in a Non-Volatile Memory Express (NVMe) storage system. The method further comprises broadcasting an Asynchronous Event Request (AER) message indicating I/O queue availability based on the deallocated I/O queue. The method further comprises allocating, in response to the AER message, a new I/O queue to a second entity in the NVMe storage system.

3 Claims, 10 Drawing Sheets

(56) References Cited

U.S. PATENT DOCUMENTS

| | | | |
|---|---|---|---|
| 11,079,968 B1* | 8/2021 | Patel | G06F 11/2025 |
| 11,151,064 B2* | 10/2021 | Yoshida | G06F 13/4282 |
| 11,372,785 B2* | 6/2022 | Makhervaks | G06F 3/0688 |
| 2016/0342545 A1* | 11/2016 | Arai | G06F 11/0727 |
| 2017/0308298 A1 | 10/2017 | Vyshetsky | |
| 2018/0275923 A1 | 9/2018 | Earhart et al. | |
| 2019/0138209 A1 | 5/2019 | Benisty et al. | |
| 2019/0303003 A1 | 10/2019 | Freyensee et al. | |
| 2020/0019433 A1 | 1/2020 | Xin | |
| 2020/0293465 A1* | 9/2020 | Yang | H04L 49/70 |

FOREIGN PATENT DOCUMENTS

| | | | | |
|---|---|---|---|---|
| WO | WO-2017117259 A1 * | 7/2017 | | G06F 15/17331 |
| WO | 2017176775 A1 | 10/2017 | | |
| WO | 2018049899 A1 | 3/2018 | | |
| WO | 2020000483 A1 | 1/2020 | | |

OTHER PUBLICATIONS

Mell et al., "The NIST Definition of Cloud Computing", Recommendations of the National Institute of Standards and Technology, Sep. 2011, 7 pages.

"Patent Cooperation Treaty PCT International Search Report", International application No. PCT/IB2021/056963, International filing date Jul. 30, 2021, Priority Date Aug. 31, 2020, 9 pages.

* cited by examiner

INPUT/OUTPUT QUEUE HINTING FOR RESOURCE UTILIZATION

BACKGROUND

The present disclosure relates to non-volatile memory express (NVMe) storage systems, and, more specifically, to improved resource utilization and Input/Output (I/O) queue hinting in NVMe storage systems.

NVMe is a storage protocol that is designed for faster data transfer between servers, storage devices, and/or Flash controllers using Peripheral Component Interconnect Express (PCIe) storage protocols. NVMe provides a register interface and a command set that can enable high performance I/O which can be used as an alternative to traditional Small Computer System Interface (SCSI), Serial Attached SCSI (SAS), Serial Advanced Technology Attachment (SATA), and/or other standards for data transmission across storage systems. One advantage of NVMe-based PCIe Flash over SAS and SATA-based Solid State Drives (SSDs) is reduced latency in the host software stack, which, in turn, can lead to higher Input/Output Operations Per Second (IOPS) and more efficient processor (CPU) utilization.

NVMe can support parallel I/O processing with multicore servers that can result in faster I/O dispensation, thereby reducing I/O latency. NVMe can thereby improve system performance due to improved utilization of CPU resources since there can be multiple cores that are processing I/O requests simultaneously.

NVMe over Fabrics (NVMe-oF) is an extension of local PCIe NVMe that realizes the benefits of NVMe (e.g., high performance, low latency, etc.) across network fabrics. Servers and storage devices can be connected over a network (e.g., Ethernet network, Fibre Channel network, etc.) that can support NVMe commands over the fabric—thereby extending the advantages of NVMe protocols to interconnected system components.

NVMe-oF supports multiple I/O queues for regular I/O operations from host to storage systems. NVMe-oF is capable of supporting 64,000 commands in a single message queue and supporting a maximum of 65,535 I/O queues. However, each of the NVMe I/O queues needs a contiguous Direct Memory Access (DMA) memory region. The number of I/O queues that can be created is dependent on the available memory of the system. This can be, for example, on the order of 64 Gigabytes (GB) or 128 GB. Insofar as the amount of memory is fixed, this can limit the number of I/O queues that can be created. In other words, although NVMe supports the creation of 65,535 I/O queues in theory, in an application, the number of I/O queues may be limited by the amount of available memory. Accordingly, there is a need for efficient memory utilization of the memory dedicated to I/O queues.

As an example, consider a storage system having 1,000 megabytes (MB) of memory given for the NVMe driver to create I/O queue space, where each NVMe I/O queue pair (e.g., submission queue (SQ) and completion queue (CQ)) requires 10 MB. Further, consider a storage controller configured to support 100 I/O queues. In some situations, various I/O queues can be deallocated, thereby increasing the available memory. For example, if three I/O queues are deallocated from a first host, then the corresponding storage memory space is made available. However, even if this newly available memory space exists, other entities in the storage system do not know that this newly available memory space is available. This can lead to poor resource utilization and degraded performance in situations having numerous I/O queue deallocations.

SUMMARY

Aspects of the present disclosure are directed toward a method comprising identifying a deallocated I/O queue of an entity in a storage system based on an identifier in an I/O queue deallocate message received from an admin queue of the entity. The method further comprises broadcasting an Asynchronous Event Request (AER) message to similar entities in the storage system having respective numbers of I/O queues below a maximum I/O queue threshold, where the AER message indicates freed resources associated with the deallocated I/O queue that can be used for allocating new I/O queues by the similar entities in the storage system. The method further comprises allocating, in response to broadcasting the AER message, a newly allocated I/O queue to one of the similar entities by sending an I/O queue connection message via another admin queue associated with one of the similar entities.

Advantageously, the aforementioned aspects of the present disclosure increase resource utilization by allocating new I/O queues using freed resources of deallocated I/O queues. Furthermore, aspects of the present disclosure realize efficient messaging when notifying candidates for newly allocated I/O queues by sending the notification to only those entities having respective numbers of I/O queues below a maximum I/O queue threshold.

Further embodiments of the present disclosure including the aspects discussed in the aforementioned method further comprise determining, in response to allocating the newly allocated I/O queue, that additional freed resources of the deallocated I/O queue remain and broadcasting a second AER message to other entities in the storage system indicating the additional freed resources associated with the deallocated I/O queue that can be used for allocating new I/O queues by the other entities in the storage system. Advantageously, the aforementioned embodiments enable different types of entities in a storage system to create new I/O queues using freed resources from deallocated I/O queues.

Further aspects of the present disclosure are directed toward a system comprising a first host of a plurality of hosts communicatively coupled to one or more processing cores of a non-volatile memory express (NVMe) storage system by one or more Input/Output (I/O) queues. The system further comprises an NVMe queue manager configured to detect freed memory resources associated with a deallocated I/O queue of the one or more I/O queues associated with the first host. The system further comprises a notification engine configured to transmit a notification indicating the freed memory resources to at least a second host of the plurality of hosts, and where the second host of the plurality of hosts is configured to establish a newly allocated I/O queue with the NVMe storage system using the freed memory resources and in response to receiving the notification.

Advantageously, the aforementioned aspects of the present disclosure increase resource utilization by allocating new I/O queues using freed resources of deallocated I/O queues.

Further embodiments of the present disclosure, including the aspects discussed in the aforementioned system further comprise where the notification engine is further configured to verify that the second host has a number of I/O queues below a maximum number of I/O queues permitted by the NVMe storage system. Advantageously, these aspects of the present disclosure realize efficient messaging when notifying candidates for newly allocated I/O queues by sending the notification to only those entities having respective numbers of I/O queues below a maximum I/O queue threshold.

Further aspects of the present disclosure are directed toward a computer-implemented method comprising detecting a deallocated Input/Output (I/O) queue associated with a first entity in a Non-Volatile Memory Express (NVMe) storage system. The method further comprises broadcasting an Asynchronous Event Request (AER) message indicating I/O queue availability based on the deallocated I/O queue. The method further comprises allocating, in response to the AER message, a new I/O queue to a second entity in the NVMe storage system.

Advantageously, the aforementioned aspects of the present disclosure increase resource utilization by allocating new I/O queues using freed resources of deallocated I/O queues.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
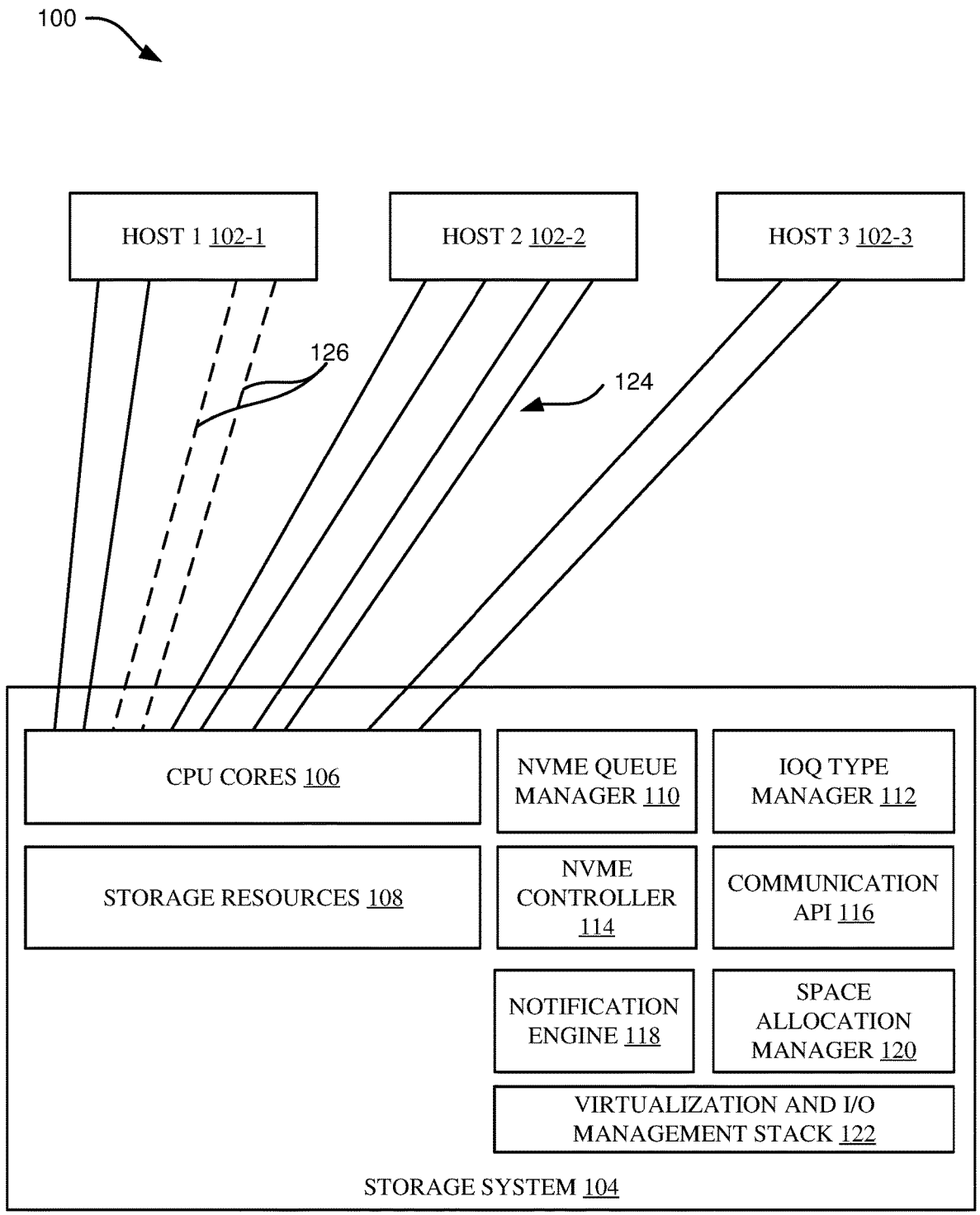
FIG. 1 illustrates a block diagram of an example computational environment at a first time, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward non-volatile memory express (NVMe) storage systems, and, more specifically, to improved resource utilization and Input/Output (I/O) hinting in NVMe storage systems. While not limited to such applications, embodiments of the present disclosure may be better understood in light of the aforementioned context.

Host drivers (or other backend or internode entities of a storage system) are able to initiate the creation of I/O queues. Once the host is connected to a target system, a special purpose queue can be created (e.g., an admin queue). The admin queue can be used to transfer control commands from an initiator to a target device. Once the admin queue is created, it can be used by a host to create I/O queues based on system requirements. The host may establish multiple I/O queues to a single controller with the same NVMe Qualified Name (NQN) and have multiple namespaces (or volumes) mapped to it. Once the I/O queues are established, I/O commands can be submitted to an I/O Submission Queue (SQ), and I/O responses can be collected in an I/O Completion Queue (CQ). These I/O queues can be added (e.g., allocated) or removed (e.g., deallocated) using control instructions sent via the admin queue.

When a command is received on a target device for I/O queue creation, it can perform initial system checks (e.g., checking for maximum supported queues, etc.) and create an I/O queue and assign the newly created I/O queue to a CPU core on the storage controller. A response to the queue creation request can be returned to the admin CQ. Each I/O queue can be assigned to a different CPU core on the storage controller. This can enable parallelism and boost the throughput of the system. Core assignment logic can be implemented at the target storage controller. Further, I/O queue-to-core mapping can be performed based on a predefined policy at the storage controller.

As previously discussed, the NVMe protocol can support 65,535 I/O queues that can be assigned to different cores to achieve parallelism. These queues can be created based on host requirements. Once the admin queue is created, I/O queues can be created by sending instructions through the admin queue indicating host capabilities and needs. The host can create I/O queues at any time based on the requirements of the storage target. Algorithms associated with the storage target can associate newly created I/O queues to CPU cores, and all the I/O operations submitted to the newly created I/O queues can be served by the assigned core.

At the time of I/O queue creation, the NVMe driver can create a Direct Memory Access (DMA) pool of physical region pages for allocating the DMA memory space in the target device and the initiator device. The pools can be created for the I/O operations for the I/O queues, and the memory from the pool can be reserved for the I/O operations coming to a respective I/O queue. A DMA pool can be considered an allocation mechanism for small, coherent DMA mappings.

Aspects of the present disclosure are directed to notifying other entities of a storage system regarding newly available memory space from deallocated (e.g., detached, deleted, etc.) I/O queues. Aspects of the present disclosure can utilize Asynchronous Event Request or another message type to trigger additional I/O queue creation. Enabling entities of the storage system to utilize newly available memory space for the allocation of new I/O queues improves resource utilization and provides corresponding performance benefits.

More specifically, aspects of the present disclosure are directed toward a mechanism by which NVMe storage subsystems can realize improved resource utilization. In some embodiments, when an NVMe driver's I/O queue allocation memory is fully allocated to all of its NVMe I/O queues, then aspects of the present disclosure can identify available memory space in related entities of the NVMe storage subsystem that may have been made available by an I/O queue deallocation process.

For example, consider a storage virtualization system that accommodates a maximum of 100 I/O queues, which are each attached to an external entity. In this example, if one or more of the entities deallocates (e.g., deletes, disconnects, etc.) any of the I/O queues, then aspects of the present disclosure can identify the deallocated I/O queues and their corresponding available space. Furthermore, aspects of the present disclosure can generate a message identifying the available space for other entities in the storage system to create additional I/O queues.

In embodiments where a storage controller has enabled a maximum I/O queue threshold per host limit, then any generated message can be sent to only those hosts that have a number of I/O queues (or pending I/O queue creations) below the maximum I/O queue threshold. Advantageously, sending the generated messages to only those hosts with a number of I/O queues below the I/O queue threshold reduces network bandwidth by only transmitting the message to hosts that are eligible to utilize the newly available space by creating a new I/O queue.

Further aspects of the present disclosure are configured to allow the creation of temporary I/O queues and/or permanent I/O queues based on compliance with policies associated with the storage system (e.g., dedicated queue reservations for a host, backend communication limits, internode communication limits, etc.). In the event that the backend storage array's queues are deallocated, and the controller contains the policy that reserves 10 I/O queues for virtualization purposes, then all the virtualization storage controllers can be messaged via the NVMe's in-band Application Programming Interface (API) mechanism using, for example, AER messages, or out-of-band messaging schemes such as device integration APIs capable of understanding out-of-band messages. In embodiments where an I/O queue was not created by any of the storage arrays, then other entities in the storage system (e.g., hosts) can be informed regarding additional I/O queue space and temporary I/O queues can be created. These temporary I/O queues can be detached in case any virtualization IOQ_CONNECT requests were to be received in the future.

Upon receiving a space availability signal from a storage controller target system, an entity's NVMe driver can look for the existing I/O queues created between the initiator and the storage target. If the command is received by the host/storage/node entity, it is the entity's responsibility to determine whether to create the additional I/O queue or not. This decision can be based on the I/O workload pattern of the initiator. As an example, if the host intends to use an IOPS-intensive workload, then it may be beneficial to create additional I/O queues in order to realize improved performance. Alternatively, if the host has a bandwidth-intensive workload or lower performance requirements, then the host may ignore the signal initiated by the storage controller.

In the event that the initiator elects to create the I/O queue, then the admin queue can be engaged to communicate an IOQ_CREATE message exchange, and the I/O queues can be established. Once the IOQ_CREATE function is completed, the initiator's NVMe driver can collect the information about the nature of the I/O queue (e.g., temporary, additional, spare, permanent, etc.), and update its metadata map of I/O queues which can be used by the NVMe driver for taking future deallocation request operations and/or other queue management operations.

Furthermore, in accordance with some embodiments of the present disclosure, at the time of I/O queue creation, the storage target can map the status of the I/O queue based on the system policies (e.g., permanent, temporary, etc.). In the event that the created I/O queue is temporary, then the storage target can keep the map of temporary I/O queues as an IOQ_ID array. In the event that the IOQ_CREATE request comes from that entity for which the I/O queue pool is reserved, then some of the I/O queues can be deallocated, and a new IOQ_CREATE request can be acknowledged. Doing so can make the system compliant with the I/O queue reservation policies and provide parallelism benefits to the applications as well as improve utilization of the resources.

In some situations, if an initiator can handle some performance degradation or limited IOPS, then it may maintain existing connections to the target with available I/O queues that are already created. In such cases, the host NVMe driver can neglect the memory availability message and continue with the existing I/O queues.

Communication between the NVMe queue manager and initiator notifier can be through out-of-band protocols or in-band communication. When out-of-band, aspects of the present disclosure can use out-of-band APIs that are configured to communicate between hosts, backend, internode, and/or the storage controller. When in-band, aspects of the present disclosure can use NVMe standards that may allow for information to be exchanged programmatically using protocol frames. For example, when in-band, reserved fields of the IOQ_CONNECT response frame can be used to communicate inessential queue connect information.

Various aspects of the present disclosure realize numerous advantages. For one, aspects of the present disclosure can improve memory utilization insofar as aspects of the present disclosure can provide a memory availability signal when I/O queues are deallocated from a storage target, and their corresponding memory becomes available for other I/O queues. Accordingly, the memory resources of the deallocated I/O queues can be rapidly identified and redeployed in accordance with aspects of the present disclosure. Doing so can benefit those hosts and/or storage arrays that are able to utilize the memory resources from the deallocated I/O queues to generate new I/O queues.

A second benefit relates to improved host connectivity insofar as aspects of the present disclosure store metadata indicating types of I/O queues (e.g., temporary, spare, permanent, etc.). Maintaining metadata indicating types of I/O queues is beneficial during the deallocation of I/O queues to ensure an appropriate I/O queue is deallocated (e.g., it can be less problematic to deallocate a temporary I/O queue relative to a permanent I/O queue).

A third benefit relates to implementation insofar as aspects of the present disclosure do not require any specialized hardware beyond what is typically available in various storage systems. Accordingly, aspects of the present disclosure can be retrofitted to existing storage systems by downloading, uploading, or otherwise transferring software to the existing storage systems and executing the software.

A fourth benefit relates to efficient communications insofar as messages indicating availability from recently deallocated I/O queues are only sent to those entities that are eligible for creating a new I/O queue (e.g., based on system policies, etc.). As a further improvement to communication efficiency, aspects of the present disclosure can re-initialize IOQ_CONNECT messages once an accommodation capacity is detected, thereby avoiding continuous polling of the IOQ_CONNECT functionality. Accordingly, aspects of the present disclosure realize improved communication efficiency while maintaining efficacy.

Referring now to the figures, FIG. 1 illustrates a computational environment 100 at a first time, including hosts 102 (e.g., host 1 102-1, host 2 102-2, and host 3 102-3) coupled to a storage system 104 by a plurality of I/O queues 124. The I/O queues 124 interface with CPU cores 106 and/or storage resources 108. The storage system 104 further includes a NVMe queue manager 110 for managing the I/O queues 124, an I/O queue (IOQ) type manager 112 for storing metadata regarding types of I/O queues 124 (e.g., host, backend, internode, permanent, temporary, etc.), a NVMe controller 114 for controlling aspects of the storage system 104, a communication API 116 for in-band and/or out-of-band communication between entities of the computational environment 100, a notification engine 118 for communicating notifications, such as indications of available I/O queue resources via AER messages, to various entities in the computational environment 100, a space allocation manager 120 for managing memory resources associated with I/O queues 124 amongst the entities in the computational environment 100, and a virtualization and I/O management stack 122 for managing virtualized aspects of the computational environment 100. As shown in FIG. 1, the computational environment 100 at the first time further includes two deallocated I/O queues 126 between host 1 102-1 and the storage system 104 (deallocated I/O queues 126 illustrated by dashed lines). Aspects of the present disclosure are directed to detecting deallocated I/O queues 126 and notifying eligible entities in the computational environment 100 of available I/O queue resources that are freed by the deallocated I/O queues 126.

Figure 2:
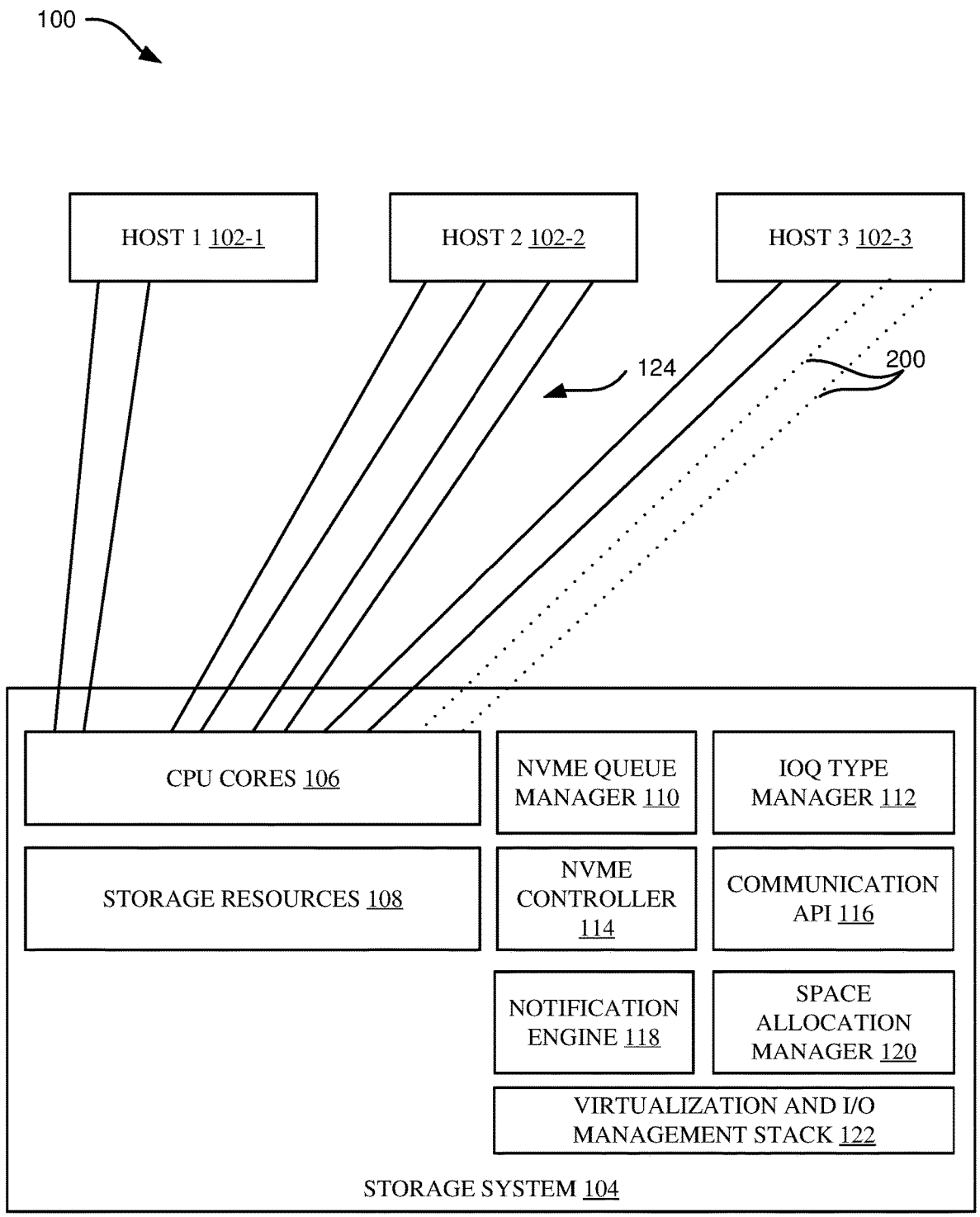
FIG. 2 illustrates a block diagram of an example computational environment at a second time, in accordance with some embodiments of the present disclosure.

FIG. 2 illustrates the computational environment 100 at a second time. Notably, the computational environment 100 at the second time illustrates newly allocated I/O queues 200 (as illustrated by the dotted lines) connecting host 3 102-3 to the storage system 104 using the freed resources from deallocated I/O queues 126 as discussed in FIG. 1.

In the context of FIGS. 1 and 2, aspects of the present disclosure can be configured to implement the following steps: (i) an entity in computational environment 100 (e.g., host 1 102-1) generates a I/O queue deallocation request; (ii) the requested I/O queues 124 are deleted, disconnected, or deallocated to create deallocated I/O queues 126; (iii) NVMe queue manager 110, IOQ type manager 112, and/or space allocation manager 120 collects information regarding the deallocated I/O queues 126; (iv) an AER message is generated (e.g., by the notification engine 118) and broadcast (e.g., by the communication API 116) to eligible entities in the computational environment, where the AER message notifies the eligible entities of available resources for the creation of new I/O queues; and/or (v) newly allocated I/O queues 200 are allocated using the freed resources of the deallocated I/O queues 126 as indicated in the broadcast AER message.

Figure 3:
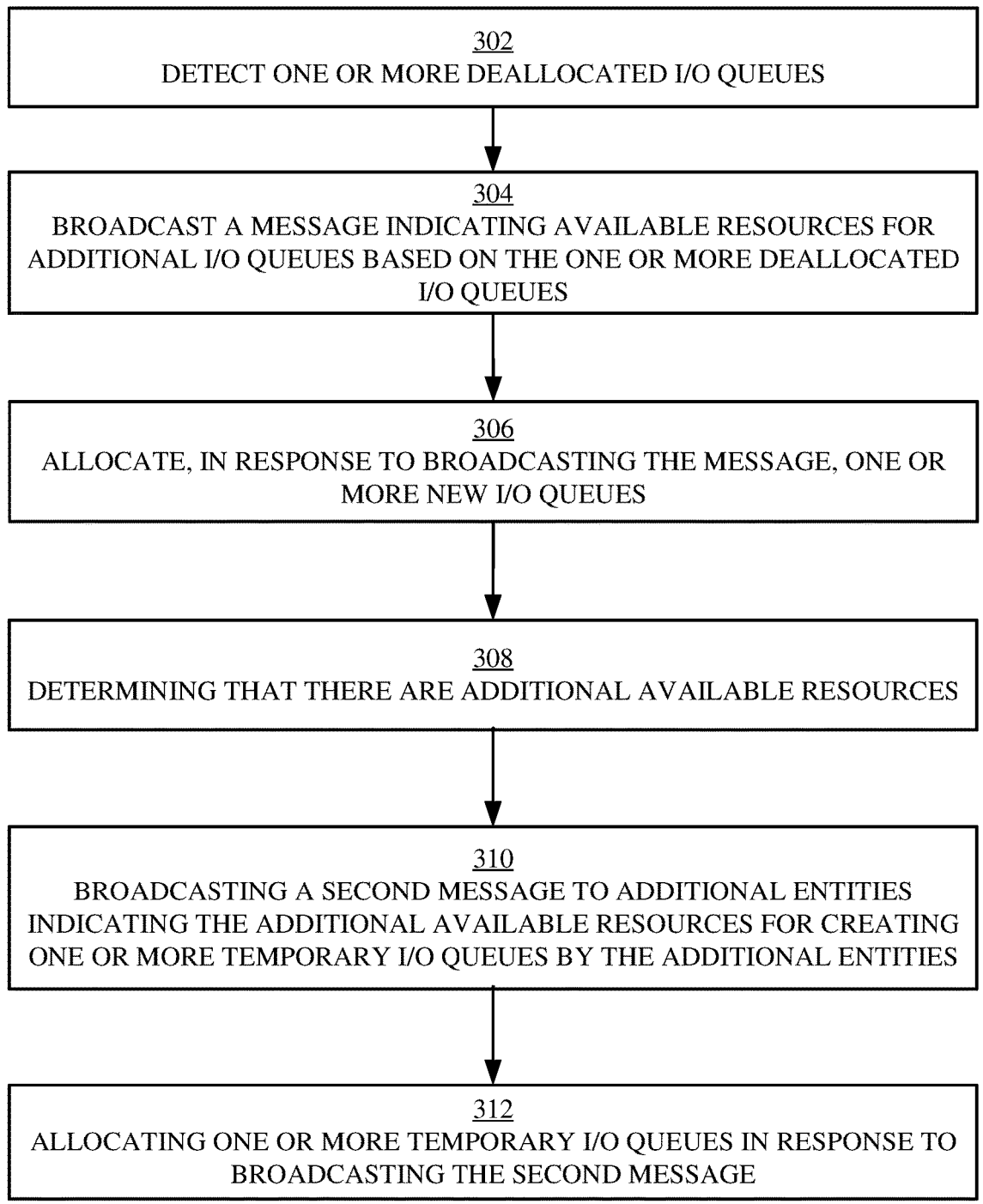
FIG. 3 illustrates a flowchart of an example method for using I/O queue hinting to improve resource utilization in the storage system, in accordance with some embodiments of the present disclosure.

Referring now to FIG. 3, illustrated is a flowchart of an example method 300 for using I/O queue hinting to improve resource utilization in storage systems, in accordance with some embodiment of the present disclosure. The method 300 can be implemented by, for example, one or more entities in a computational environment 100, a storage system 104, a computer, a processor, or another configuration of hardware and/or software.

Operation 302 includes detecting one or more deallocated I/O queues 126. Operation 302 is discussed in more detail, hereinafter with respect to FIG. 4.

Operation 304 includes broadcasting a message indicating available resources for additional I/O queues based on the detected one or more deallocated I/O queues 126. In some embodiments, the message is an AER message (e.g., a message embedded in an AER command). In some embodiments, the message is sent to similar entities (e.g., hosts, backends, internodes) as the entity associated with the one or more deallocated I/O queues 126.

Operation 306 includes allocating, in response to broadcasting the message, one or more newly allocated I/O queues 200. In some embodiments, the newly allocated I/O queues 200 are permanent I/O queues, while in other embodiments, the newly allocated I/O queues are temporary I/O queues. Whether the newly allocated I/O queues are temporary or permanent can be based on policies associated with the computational environment 100. For example, temporary I/O queues may be used in situations where the deallocated I/O queues 126 may have been deallocated due to a network outage or other hardware malfunction. In such situations, the temporary I/O queues can be deallocated, and the resources reallocated to the originally deallocated I/O queues 126 if the original deallocation was inadvertent.

Operation 308 includes determining that there are additional available resources after allocating the one or more newly allocated I/O queues 200. For example, similar entities as the entity associated with the deallocated I/O queues 126 may not need an equal number of newly allocated I/O queues 200. Accordingly, operation 310 includes broadcasting a second message to additional entities (e.g., entities that are of a different type from the type of entity associated with the deallocated I/O queues 126) indicating the additional available resources for creating one or more temporary I/O queues by one or more of the additional entities. Operation 312 includes allocating one or more temporary I/O queues in response to broadcasting the second message.

Figure 4:
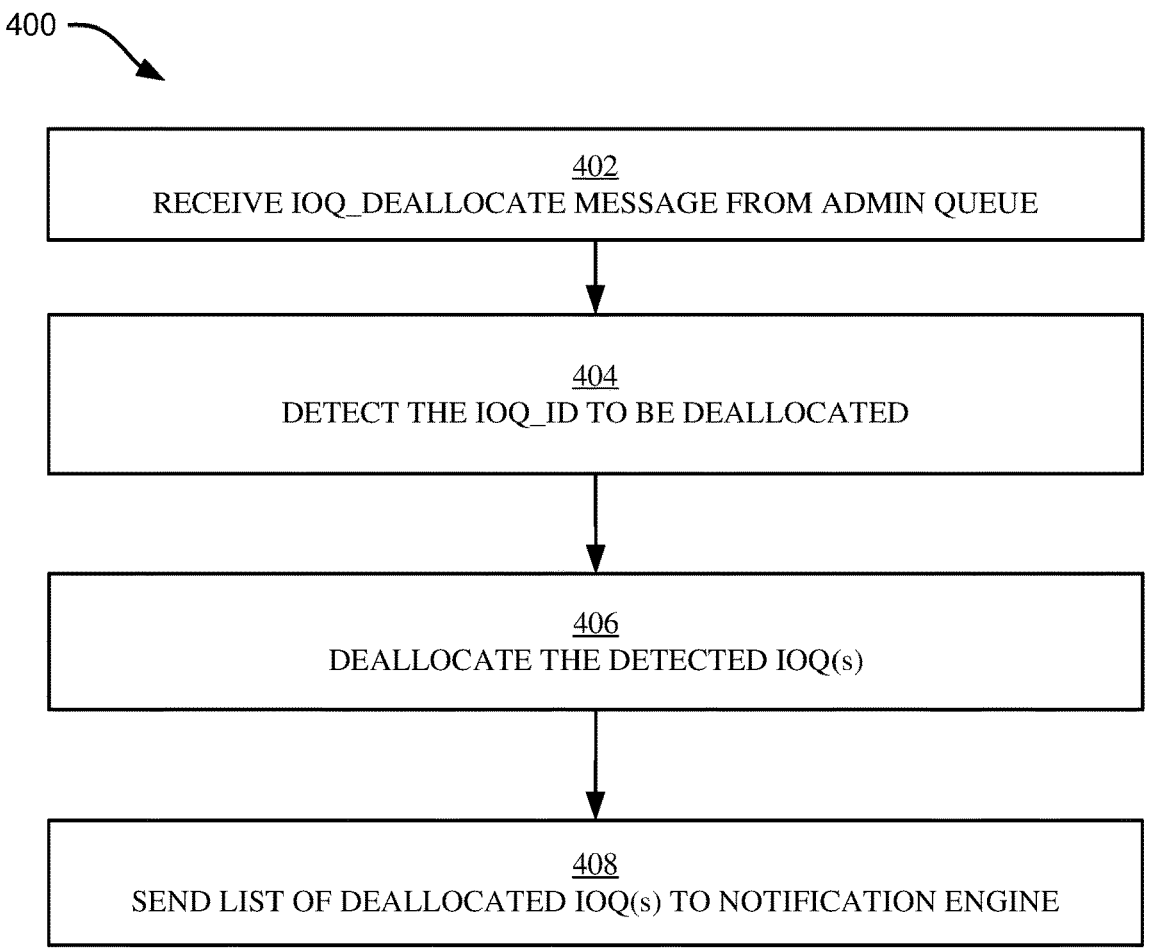
FIG. 4 illustrates a flowchart of an example method for detecting deallocated I/O queues, in accordance with some embodiments of the present disclosure.

Referring now to FIG. 4, illustrated is a flowchart of an example method 400 for detecting available I/O queue resources, in accordance with some embodiment of the present disclosure. The method 400 can be implemented by, for example, one or more entities in a computational environment 100, a storage system 104, a computer, a processor, or another configuration of hardware and/or software. In some embodiments, the method 400 is a sub-method of operation 302 of FIG. 3.

Operation 402 includes receiving an I/O queue deallocation message (e.g., IOQ_DEALLOCATE command) from an admin queue. Operation 404 includes detecting one or more I/O queue identifiers (e.g., IOQ_IDs) to be deallocated based on the I/O queue deallocation message. Operation 406 includes deallocating the corresponding I/O queues to create deallocated I/O queues 126. Operation 408 includes sending a list of the deallocated I/O queues 126 to a notification engine 118, where the notification engine 118 can be configured to broadcast, to eligible entities in the computational environment 100, an indication (e.g., an AER message) of the freed resources corresponding to the deallocated I/O queues 126 as discussed in more detail hereinafter with respect to FIG. 5.

Figure 5:
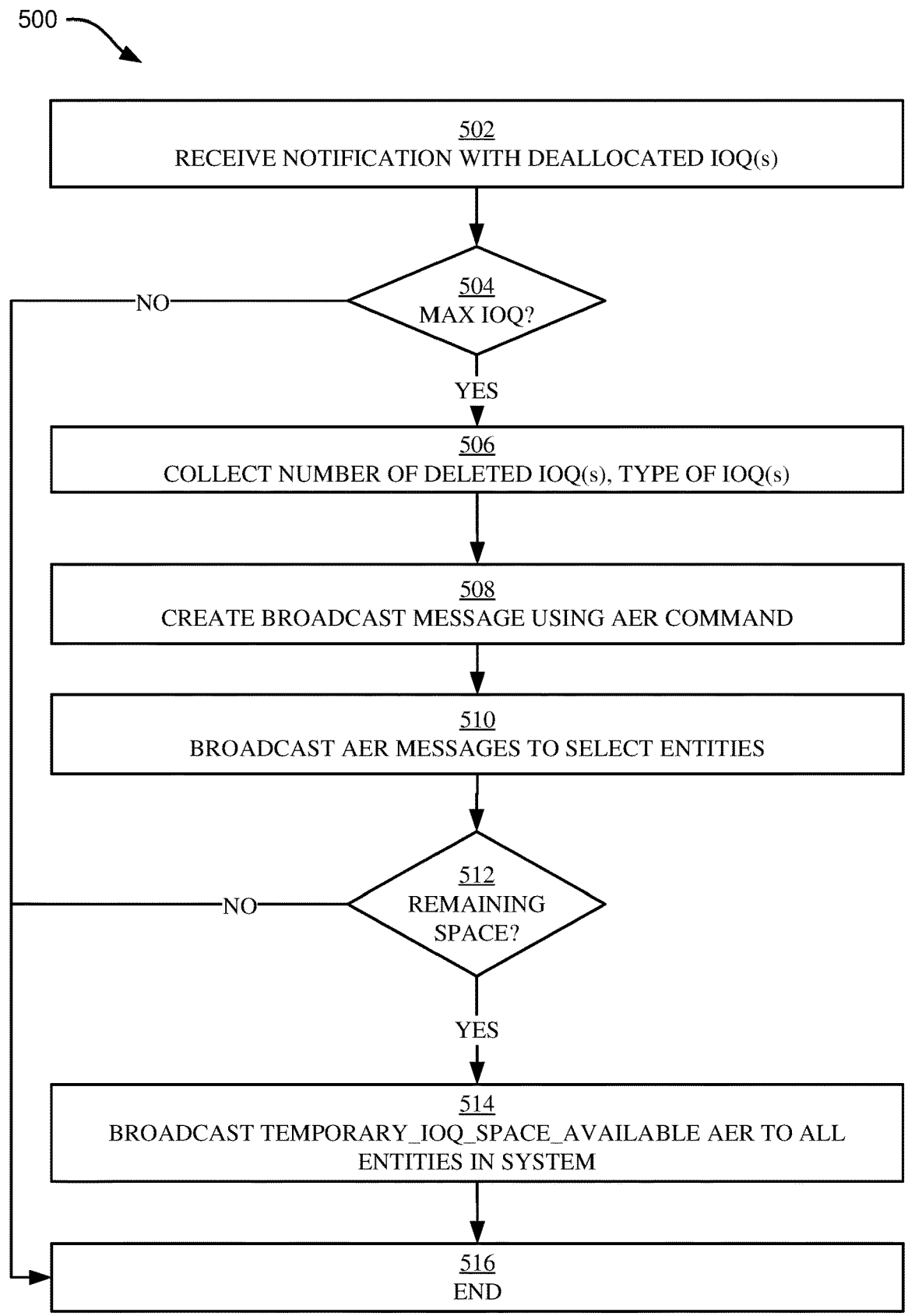
FIG. 5 illustrates a flowchart of an example method for broadcasting AER messages, in accordance with some embodiments of the present disclosure.

Referring now to FIG. 5, illustrated is a flowchart of an example method 500 for broadcasting a message indicating available I/O queue resources, in accordance with some embodiment of the present disclosure. The method 500 can be implemented by, for example, one or more entities in a computational environment 100, a storage system 104, a computer, a processor, or another configuration of hardware and/or software. In some embodiments, the method 500 can be implemented after the method 400 of FIG. 4. In some embodiments, the method 500 is a sub-method of operation 304 and/or 310 of FIG. 3.

Operation 502 includes receiving a notification of the deallocated I/O queues 126 at the notification engine 118. Operation 504 includes determining if a maximum number of I/O queues was reached by the computational environment 100 prior to the deallocation of the deallocated I/O queues 126. If not (504: NO), the method 500 proceeds to operation 516 and ends insofar as it is less useful to redeploy deallocated I/O queue resources when the computational environment has excess I/O queue resources. If so (504: YES), then the method 500 proceeds to operation 506.

Operation 506 includes collecting a number of deallocated I/O queues 126 and a type (e.g., temporary, permanent, host, backend, internode, etc.) of each of the deallocated I/O queues 126. Operation 508 includes creating a broadcast message using the AER command. Operation 510 includes broadcasting AER message(s) to select entities. For example, the AER message can be broadcast first to similar entities as the entity associated with the deallocated I/O queues 126 and later to other types of entities in the storage system. Furthermore, in some situations, the message can indicate that temporary I/O queues can be created while in other embodiments, the message can indicate that permanent I/O queues can be created. Operation 510 is discussed in more detail, hereinafter with respect to FIG. 6.

Operation 512 includes determining if there is remaining space available after operation 510 (e.g., if the same type of entities as the entities associated with the deallocated I/O queues 126 do not use all of the freed resources of the deallocated I/O queues 126 for creating newly allocated I/O queues 200). If not (512: NO), then the method 500 proceeds to operation 516 and ends insofar as there are no additional deallocated I/O queue resources that can be redeployed. If so (512: YES), then the method 500 proceeds to operation 514. Operation 514 includes broadcasting a second AER message indicating that resources are available for creating temporary I/O queues (e.g., TEMPORARY_IOQ_SPACE_AVAILABLE AER message) to all entities in the computational environment 100. The method 500 can then end at operation 516.

Figure 6:
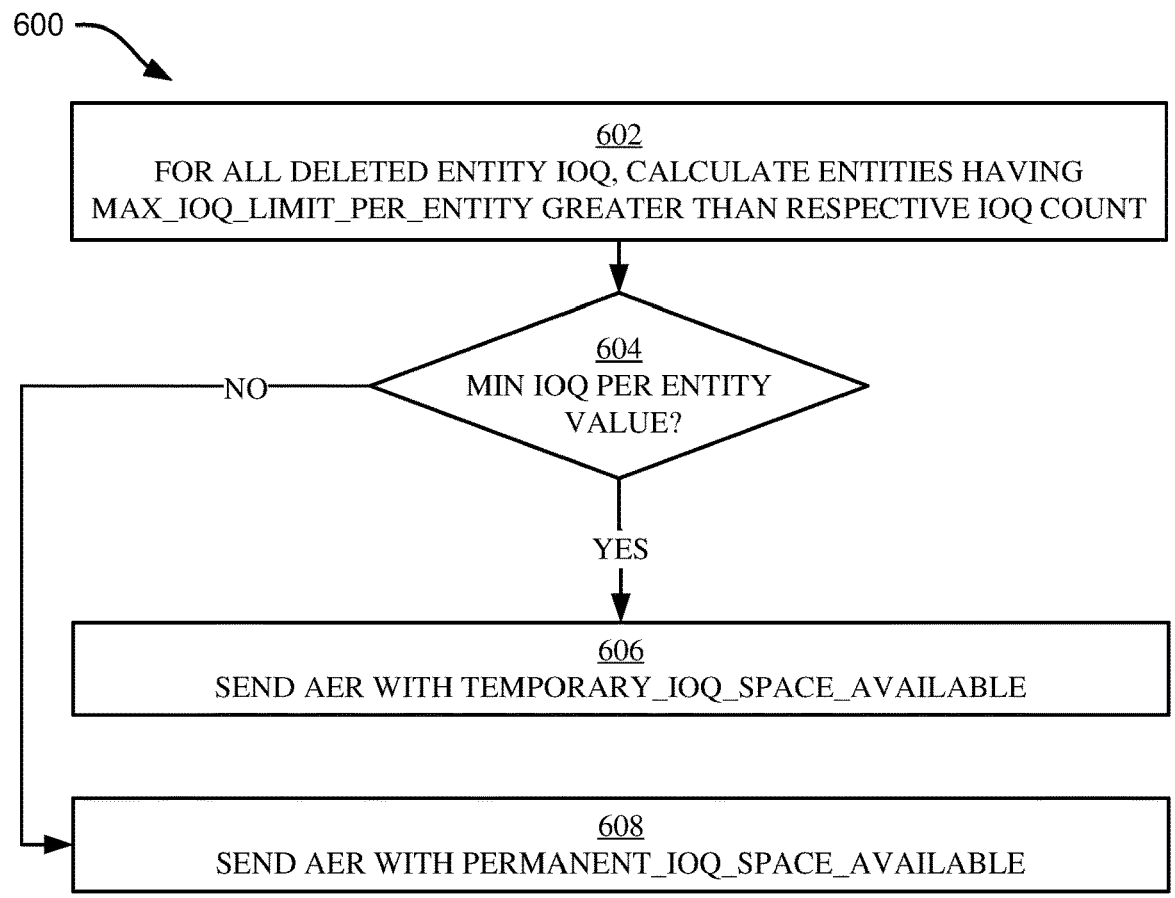
FIG. 6 illustrates a flowchart of an example method for generating AER messages, in accordance with some embodiments of the present disclosure.

Referring now to FIG. 6, illustrated is a flowchart of an example method 600 for broadcasting AER messages to select entities, in accordance with some embodiments of the present disclosure. The method 600 can be implemented by, for example, one or more entities in a computational environment 100, a storage system 104, a computer, a processor, or another configuration of hardware and/or software. In some embodiments, the method 600 can be a sub-method of operation 510 of FIG. 5.

Operation 602 includes, for all deallocated I/O queues 126 for a given type of entity (e.g., host, internode, backend, etc.), calculating a number of similar entities having a maximum I/O queue threshold (e.g., MAX_IOQ_LIMIT_PER_ENTITY) greater than their respective I/O queue count. In other words, operation 602 determines how many I/O queues similar entities can create (or verifies which entities have the capacity to create additional I/O queues) using the freed resources of deallocated I/O queues 126 as permitted by (e.g., not exceeding) the maximum I/O queue threshold.

Operation 604 includes determining if there is a minimum I/O queue count per entity (e.g., host, internode, backend, etc.). If not (604: NO), then the method 600 proceeds to operation 608 and sends an AER message with an indication of resources available for the creation of permanent I/O queues (e.g., PERMANENT_IOQ_SPACE_AVAILABLE) to the entities designated in operation 602. If so (604: YES), then the method 600 proceeds to operation 606 and sends an AER message with an indication of resources available for the creation of temporary I/O queues (e.g., TEMPORARY_IOQ_SPACE_AVAILABLE) to the entities designated in operation 602.

The method 600 can be configured to send indications of temporary I/O queue availability in those situations with a minimum I/O queue threshold because the existence of a minimum I/O queue threshold increases the probability of the entity associated with the deallocated I/O queue 126 inadvertently deallocating that I/O queue due to network interruptions, hardware malfunctions, and/or software malfunctions and subsequently requiring the deallocated I/O queue 126 to be reallocated to comply with the minimum I/O queue threshold. Conversely, the method 600 can be configured to send indications of permanent I/O queue availability in those situations without a minimum I/O queue threshold because there is a lower likelihood that the entity associated with the deallocated I/O queue 126 will need to reallocate the deallocated I/O queue 126 to comply with a minimum I/O queue threshold.

Figure 7:
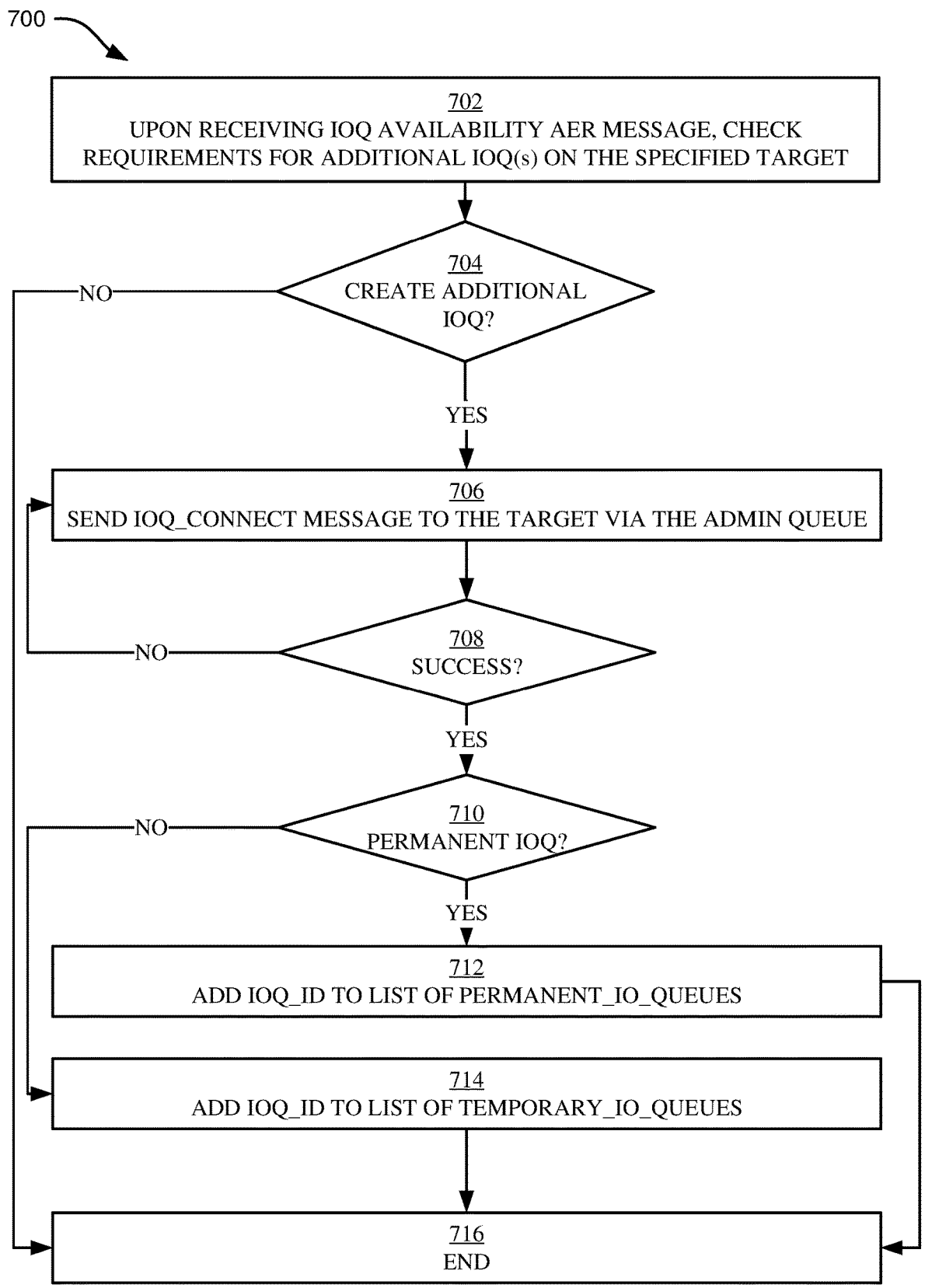
FIG. 7 illustrates a flowchart of an example method for allocating new I/O queues, in accordance with some embodiments of the present disclosure.

Referring now to FIG. 7, illustrated is a flowchart of an example method 700 for creating a newly allocated I/O queue 200, in accordance with some embodiments of the present disclosure. The method 700 can be implemented by, for example, one or more entities in a computational environment 100, a storage system 104, a computer, a processor, or another configuration of hardware and/or software. In some embodiments, the method 700 can be performed following the method 500 of FIG. 5. In some embodiments, the method 700 is a sub-method of operations 306 and/or 312 of FIG. 3.

Operation 702 includes, in response to receiving an AER message indicating I/O queue availability, checking requirements for additional I/O queue(s) on a specified target. Operation 704 includes determining if an additional I/O queue should be created based on the requirements checked in operation 702. If not (704: NO), then the method 700 can proceed to operation 716 and end insofar as no new I/O queue will be allocated. If so (704: YES), then the method 700 can proceed to operation 706 and send a message requesting allocation of a new I/O queue (e.g., IOQ_CONNECT message) to the target via the admin queue. Operation 708 can determine if the message was successful. If not (708: NO), then the method 700 can return to operation 706 and re-attempt the message requesting allocation of a new I/O queue (or the method 700 can proceed to operation 716 and end). If so (708: YES), then the method 700 can proceed to operation 710.

Operation 710 includes determining if the I/O queue request is for a permanent I/O queue. If not (710: NO), then the method 700 can proceed to operation 714 and add the I/O queue identifier of the newly allocated I/O queue 200 (e.g., IOQ_ID) to the list of temporary I/O queues (e.g., TEMPORARY_IO_QUEUES) which may be stored in, for example, IOQ type manager 112. If so (710: YES), then the method 700 can proceed to operation 712 and add the I/O queue identifier of the newly allocated I/O queue 200 (e.g., IOQ_ID) to the list of permanent I/O queues (e.g., PERMANENT_IO_QUEUES) which can also be stored in, for example, the IOQ type manager 112. Regardless, both operations 712 and 714 proceed to operation 716, where the method 700 ends.

Figure 8:
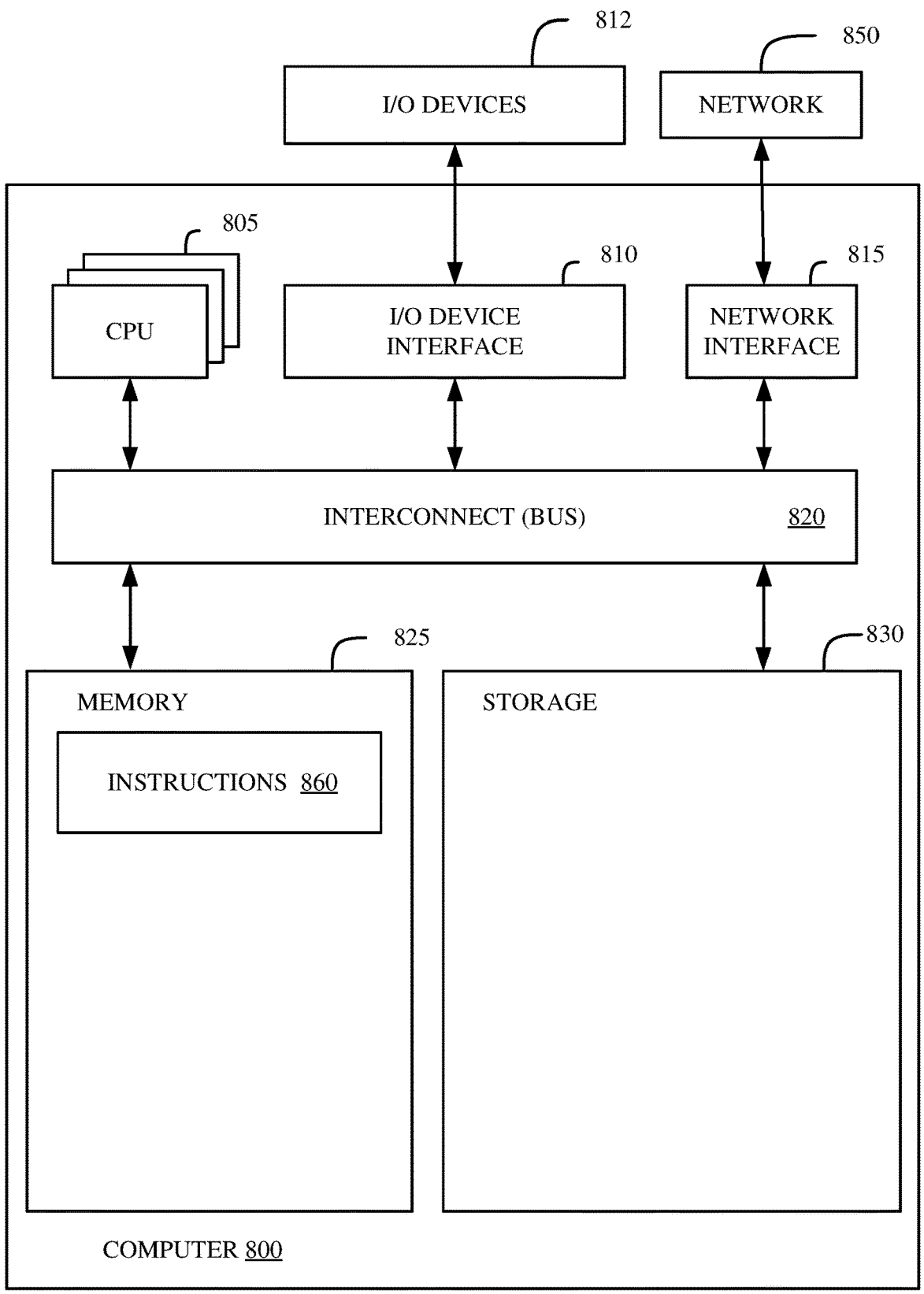
FIG. 8 illustrates a block diagram of an example computer, in accordance with some embodiments of the present disclosure.

FIG. 8 illustrates a block diagram of an example computer 800 in accordance with some embodiments of the present disclosure. In various embodiments, computer 800 can perform any or all of the methods described in FIGS. 3-7 and/or implement the functionality discussed in one or more of FIGS. 1-2. In some embodiments, computer 800 receives instructions related to the aforementioned methods and functionalities by downloading processor-executable instructions from a remote data processing system via network 850. In other embodiments, computer 800 provides instructions for the aforementioned methods and/or functionalities to a client machine such that the client machine executes the method, or a portion of the method, based on the instructions provided by computer 800. In some embodiments, the computer 800 is incorporated into (or functionality similar to computer 800 is virtually provisioned to) one or more entities of the computational environment 100 and/or other aspects of the present disclosure.

Computer 800 includes memory 825, storage 830, interconnect 820 (e.g., BUS), one or more CPUs 805 (also referred to as processors herein), I/O device interface 810, I/O devices 812, and network interface 815.

Each CPU 805 retrieves and executes programming instructions stored in memory 825 or storage 830. Interconnect 820 is used to move data, such as programming instructions, between the CPUs 805, I/O device interface 810, storage 830, network interface 815, and memory 825. Interconnect 820 can be implemented using one or more busses. CPUs 805 can be a single CPU, multiple CPUs, or a single CPU having multiple processing cores in various embodiments. In some embodiments, CPU 805 can be a digital signal processor (DSP). In some embodiments, CPU 805 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random-access memory (e.g., static random-access memory (SRAM), dynamic random-access memory (DRAM), or Flash). Storage 830 is generally included to be representative of a non-volatile memory, such as a hard disk drive, solid state device (SSD), removable memory cards, optical storage, or flash memory devices. In an alternative embodiment, storage 830 can be replaced by storage area-network (SAN) devices, the cloud, or other devices connected to computer 800 via I/O device interface 810 or network 850 via network interface 815.

In some embodiments, memory 825 stores instructions 860. However, in various embodiments, instructions 860 are stored partially in memory 825 and partially in storage 830, or they are stored entirely in memory 825 or entirely in storage 830, or they are accessed over network 850 via network interface 815.

Instructions 860 can be computer-readable and computer-executable instructions for performing any portion of, or all of, the methods of FIGS. 3-7 and/or implementing the functionality discussed in any portion of FIGS. 1-2. Although instructions 860 are shown in memory 825, instructions 860 can include program instructions collectively stored across numerous computer-readable storage media and executable by one or more CPUs 805.

In various embodiments, I/O devices 812 include an interface capable of presenting information and receiving input. For example, I/O devices 812 can present information to a user interacting with computer 800 and receive input from the user.

Computer 800 is connected to network 850 via network interface 815. Network 850 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
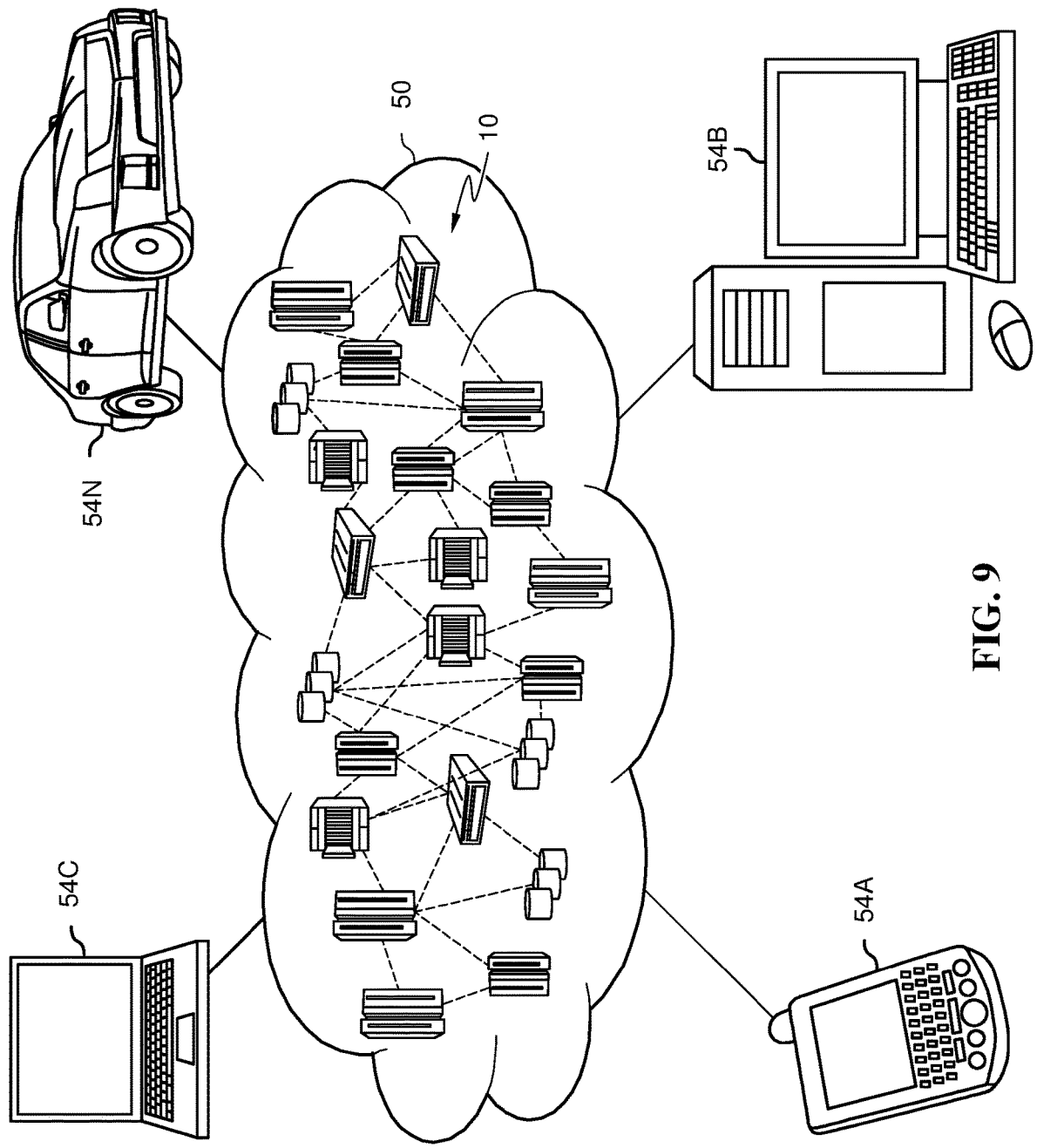
FIG. 9 depicts a cloud computing environment, in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
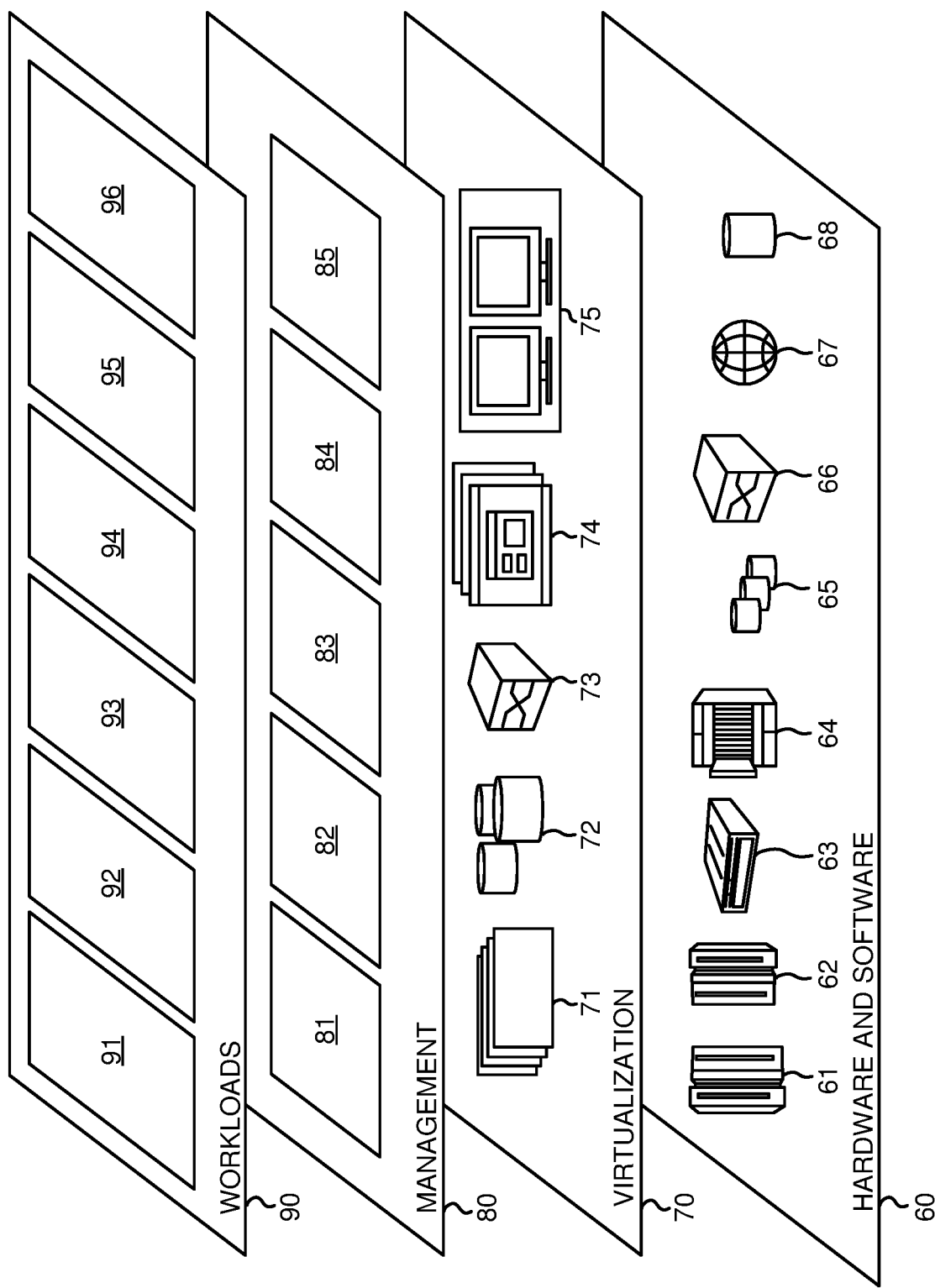
FIG. 10 depicts abstraction model layers, in accordance with some embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and I/O queue hinting for improved resource utilization 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 860 of FIG. 8 and/or any software configured to perform any portion of the methods described with respect to FIGS. 3-7 and/or implement any portion of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes identifying a deallocated I/O queue of an entity in a storage system based on an identifier in an I/O queue deallocate message received from an admin queue associated with the entity; broadcasting an Asynchronous Event Request (AER) message to similar entities in the storage system having respective numbers of I/O queues below a maximum I/O queue threshold, wherein the AER message indicates freed resources associated with the deallocated I/O queue that can be used for allocating new I/O queues by the similar entities in the storage system; and allocating, in response to broadcasting the AER message, a newly allocated I/O queue to one of the similar entities by sending an I/O queue connection message via another admin queue associated with the one of the similar entities.

Example 2 includes the method of example 1, including or excluding optional features. In this example, the similar entities in the storage system further have a minimum I/O queue per host threshold, and wherein the AER message indicates that that there is temporary I/O queue space available.

Example 3 includes the method of any one of examples 1 to 2, including or excluding optional features. In this example, the AER message indicates that there is permanent I/O queue space available.

Example 4 includes the method of any one of examples 1 to 3, including or excluding optional features. In this example, the storage system comprises a Non-Volatile Memory Express (NVMe) storage system.

Example 5 includes the method of any one of examples 1 to 4, including or excluding optional features. In this example, the entity and the similar entities are selected from a group consisting of: hosts, backends, and internodes.

Example 6 includes the method of any one of examples 1 to 5, including or excluding optional features. In this example, the method includes determining, in response to allocating the newly allocated I/O queue, that additional freed resources of the deallocated I/O queue remain; and broadcasting a second AER message to other entities in the storage system indicating the additional freed resources associated with the deallocated I/O queue that can be used for allocating new I/O queues by the other entities in the storage system.

Example 7 includes the method of any one of examples 1 to 6, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 8 is a system. The system includes a first host of a plurality of hosts communicatively coupled to one or more processing cores of a non-volatile memory express (NVMe) storage system by one or more Input/Output (I/O) queues; a NVMe queue manager configured to detect freed memory resources associated with a deallocated I/O queue of the one or more I/O queues associated with the first host; a notification engine configured to transmit a notification indicating the freed memory resources to at least a second host of the plurality of hosts; and wherein the second host of the plurality of hosts is configured to establish a newly allocated I/O queue with the NVMe storage system using the freed memory resources and in response to receiving the notification.

Example 9 includes the system of example 8, including or excluding optional features. In this example, the notification comprises an Asynchronous Event Request (AER) notification.

Example 10 includes the system of any one of examples 8 to 9, including or excluding optional features. In this example, the notification engine configured to transmit the notification to the second host is further configured to verify that the second host has a number of I/O queues below a maximum number of I/O queues permitted by the NVMe storage system.

Example 11 includes the system of any one of examples 8 to 10, including or excluding optional features. In this example, the system further comprises an I/O queue (IOQ) type manager configured to store an I/O queue type of the newly allocated I/O queue.

Example 12 is a computer-implemented method. The method includes detecting a deallocated Input/Output (I/O) queue associated with a first entity in a Non-Volatile Memory Express (NVMe) storage system; broadcasting an Asynchronous Event Request (AER) message indicating I/O queue availability based on the deallocated I/O queue; and allocating, in response to the AER message, a new I/O queue to a second entity in the NVMe storage system.

Example 13 includes the method of example 12, including or excluding optional features. In this example, the first entity is a first type of entity, wherein the AER message is broadcast to a plurality of entities that are the first type of entity, wherein the second entity is the first type of entity, and wherein the new I/O queue is a permanent I/O queue. Optionally, the method includes determining, in response to allocating the new I/O queue, that there is additional I/O queue availability based on the deallocated I/O queue; and broadcasting a second AER message to additional entities in the NVMe storage system indicating that the additional I/O queue availability is available to the additional entities for creating temporary I/O queues.

Example 14 includes the method of any one of examples 12 to 13, including or excluding optional features. In this example, the first entity is a first type of entity, wherein the AER message is broadcast to a plurality of types of entities, wherein the second entity is a second type of entity, and wherein the new I/O queue is a temporary I/O queue. Optionally, the first type of entity is selected from a group consisting of: a host, a backend, and an internode.

Example 15 is a system. The system includes one or more processors; and one or more computer-readable storage media storing program instructions which, when executed by the one or more processors, are configured to cause the one or more processors to perform a method according to any one of examples 1 to 7 and 12 to 14, including or excluding optional features.

Example 16 is a computer program product. The computer program product includes one or more computer readable storage media, and program instructions collectively stored on the one or more computer readable storage media, the program instructions comprising instructions configured to cause one or more processors to perform a method according to any one of examples 1 to 7 and 12 to 14, including or excluding optional features.

What is claimed is:

1. A system comprising:
    a first host of a plurality of hosts communicatively coupled to one or more processing cores of a non-volatile memory express (NVMe) storage system by one or more Input/Output (I/O) queues;
    a NVMe queue manager configured to detect freed memory resources associated with a deallocated I/O queue of the one or more I/O queues;
    a notification engine configured to:
        verify that a second host of the plurality of hosts has a number of I/O queues below a maximum number of I/O queues permitted by the NVMe storage system; and
        transmit a notification indicating the freed memory resources to the second host; and
    wherein the second host is configured to establish a newly allocated I/O queue with the NVMe storage system using the freed memory resources and in response to receiving the notification.

2. The system of claim 1, wherein the notification comprises an Asynchronous Event Request (AER) notification.

3. The system of claim 1, wherein the system further comprises an I/O queue (IOQ) type manager configured to store an I/O queue type of the newly allocated I/O queue.

* * * * *